United States Patent
Narasimhan et al.

(10) Patent No.: US 10,165,792 B2
(45) Date of Patent: Jan. 1, 2019

(54) HUNGER MINIMIZED JUICE FASTING SYSTEM

(71) Applicants: Sudarshan Narasimhan, Flemington, NJ (US); Dave Narasimhan, Flemington, NJ (US)

(72) Inventors: Sudarshan Narasimhan, Flemington, NJ (US); Dave Narasimhan, Flemington, NJ (US)

( * ) Notice: Subject to any disclaimer, the term of this patent is extended or adjusted under 35 U.S.C. 154(b) by 259 days.

(21) Appl. No.: 15/220,862

(22) Filed: Jul. 27, 2016

(65) Prior Publication Data
US 2016/0366925 A1 Dec. 22, 2016

Related U.S. Application Data

(62) Division of application No. 14/512,229, filed on Oct. 10, 2014, now abandoned.

(51) Int. Cl.
| | |
|---|---|
| A23L 33/00 | (2016.01) |
| A23L 33/15 | (2016.01) |
| A23L 33/16 | (2016.01) |
| A23L 33/105 | (2016.01) |
| A23L 33/125 | (2016.01) |
| A23L 23/00 | (2016.01) |

(Continued)

(52) U.S. Cl.
CPC ............... *A23L 33/30* (2016.08); *A23L 2/02* (2013.01); *A23L 2/52* (2013.01); *A23L 23/00* (2016.08); *A23L 33/105* (2016.08); *A23L 33/125* (2016.08); *A23L 33/15* (2016.08); *A23L 33/16* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 6,069,131 A | 5/2000 | Marsh | 514/23 |
| 7,629,329 B2 | 12/2009 | Lee et al. | 514/47 |

(Continued)

OTHER PUBLICATIONS

Hunt: Benefits of liquid fasting; published online at least by Oct. 24, 2012 at: https://web.archive.org/web/20031024103129/http://www.keithhunt.com/Fast1.html (Year: 2012).*

(Continued)

*Primary Examiner* — Patricia A George
(74) *Attorney, Agent, or Firm* — Ernest D. Buff & Associates, LLC; Ernest D. Buff; Dave Narasimhan

(57) ABSTRACT

The hunger minimized fasting system relies on providing a blood glucose level at all times in the range of 5 to 10 mM, satisfying glucose needs of the brain and metabolizing blood glucose through anaerobic glycolysis to release ATP at the extramitocontrial portion of the cell. Consuming only solid free nutrient liquids eliminates brain hunger response. Liquids consumed during fasting include solid filtered vegetable soup and clear fruit juices of 8 to 12 ounces taken every 2 to 4 hours having calorie deficiency of 600 to 1400 as compared to minimal daily calorie requirements for an adult. Fat released from storage is metabolized by ATP produced by glycolysis at the extramitocontrial location and enters the interior of the mitochondria, enabling the TCA cycle. Weight loss observed during fasting is about one half to one pound per day.

5 Claims, 7 Drawing Sheets

(51) Int. Cl.
  *A23L 2/52* (2006.01)
  *A23L 2/02* (2006.01)
  *A61K 47/00* (2006.01)

(56) References Cited

U.S. PATENT DOCUMENTS

| | | | |
|---|---|---|---|
| 7,825,084 B2 | 11/2010 | Harris et al. | 514/6.5 |
| 7,897,169 B2 | 3/2011 | Ueda et al. | 424/439 |
| 8,715,742 B2 | 5/2014 | Koide | 424/523 |
| 2011/0123653 A1 | 5/2011 | McKever et al. | 424/726 |
| 2012/0027897 A1 | 2/2012 | Mark | 426/231 |

OTHER PUBLICATIONS

Ihopkc: Fasting Guidelines: published online at least by Jul. 15, 2012 at: https://web.archive.org/web/20120715050042/https://www.ihopkc.org/about/fasting-guidelines-and-information/ (Year: 2012).*

Airoloa: Benefits of liquid fasting #4. How to break the fast; published online at least by Oct. 24, 2003, as verified at: http://www.web.archive.org/web/20031024104503/http://keithhunt.com/Fast4.html.

http://physiologyonline.physiology.org/content/22/4/241. "Brain Glucose Sensing, Counterregulation, and Energy Homeostasis" by Nell Marty, et al. published at Physiology 22: 241-251, 2007.

http://themedicalbiochemistrypage.org/fatty-acid-oxidation.html The Lipolysis and the Oxidation of Fatty Acids by Michael W King.

http://en.wikipedia.org/wiki/Fatty_acid_metabolism discloses that when blood sugar is low, decreasing insulin levels signal the adipocytes to activate hormonesensitive lipase, and to convert triglycerides into free fatty acids.

http://en.wikipedia.org/wiki/Beta_oxidation states that free fatty acids cannot penetrate the plasma membrane due to their negative charge.

* cited by examiner

Stages of Glycolysis Preparatory Phase

Step 1 Glucose ($C_6H_{12}O_6$) + Hexokinase + ATP --> Glucose-6-phosphate ($C_5H_{11}O_6P_1$) + ADP

PRIOR ART

Glucose → Glucose 6-phosphate

Step 2 Glucose-6-phosphate ($C_6H_{11}O_6P_1$) + Phosphoglucoisomerase --> Fructose-6-phosphate ($C_6H_{11}O_6P_1$)

PRIOR ART

Glucose 6-phosphate → Fructose 6-phosphate

Step 3 Fructose 6-phosphate ($C_6H_{11}O_6P_1$) + phosphofructokinase + ATP --> Fructose 1,6-bisphosphate ($C_6H_{10}O_6P_1$) + ADP

Fructose 6-phosphate     Fructose 1,6-biphosphate

Step 4 Fructose 1,6-bisphosphate ($C_6H_{10}O_6P_2$) + aldolase --> Dihydroxyacetone phosphate ($C_3H_5O_3P_1$) + Glyceraldehyde phosphate ($C_3H_5O_3P_1$)

Step 5 Dihydroxyacetone phosphate ($C_3H_5O_3P_1$) --> Glyceraldehyde phosphate ($C_3H_5O_3P_1$)

Fig. 2B-1

Stages of Glycolysis Pay-off Phase

Step 6 two Glyceraldehyde phosphate ($C_3H_5O_3P_1$) + Triose phosphate dehydrogenase + $2H_- + 2P + 2NAD^+$ --> two 1,3-bisphosphoglycerate ($C_3H_4O_4P_2$) + 2NADH + $2H+$

PRIOR ART

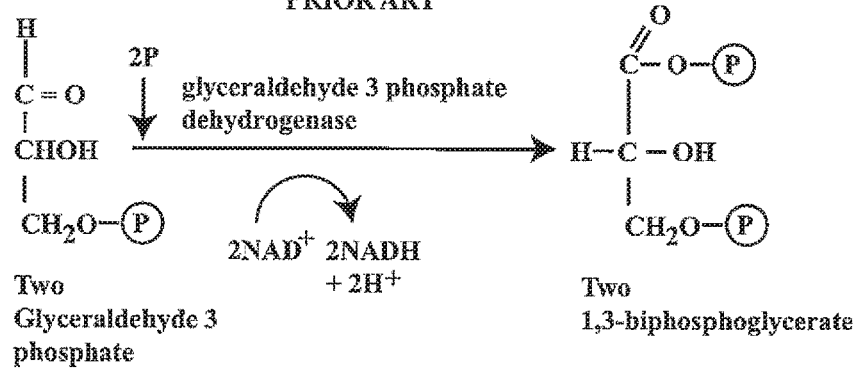

Step 7 two molecules of 1,3 bisphophoglycerate ($C_3H_4O_4P_2$)+ phosphoglycerokinase + two ADP --> two molecules of 3-phosphoglycerate ($C_3H_5O_4P_1$) + two ATP

PRIOR ART

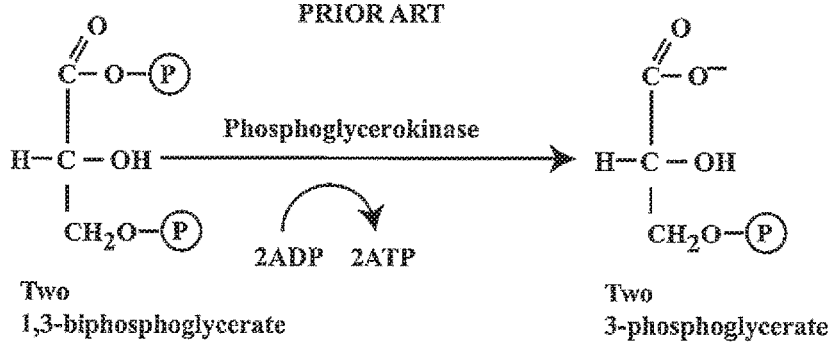

Step 8 two molecules of 3-phsophoglycerate ($C_3H_5O_4P_1$) + phosphoglyceromutase --> two molecules of 2-Phosphoglycerate ($C_3H_5O_4P_1$)

PRIOR ART

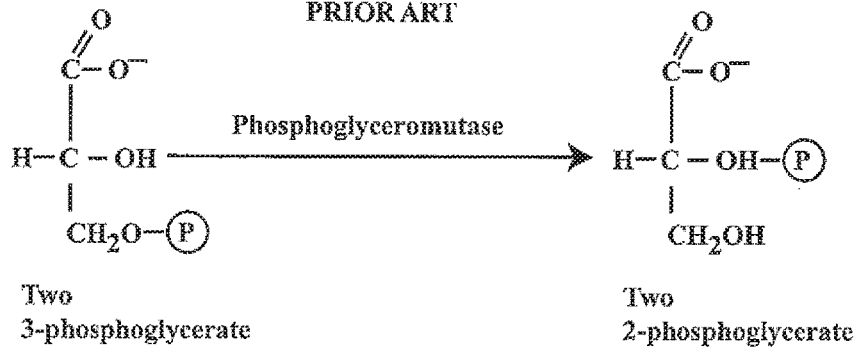

Step 9 two molecules of 2-phosphoglycerate ($C_3H_5O_4P_1$) + enolase --> two molecules of phosphoenolpyruvic acid (PEP) ($C_3H_3O_3P_1$) + $H_2O$ Two
2-phosphoglycerate Two
2-phosphoenolpyruvate Step 10 two molecules of PEP ($C_3H_3O_3P1$) + pyruvate kinase + 2 ADP --> 2 molecules of pyruvic acid ($C_3H_4O_3$) + 2 ATP Two
phosphoenolpyruvate Two
Pyruvate

PRIOR ART

HUNGER MINIMIZED JUICE FASTING SYSTEM

CROSS-REFERENCE TO RELATED APPLICATION

This application is a division of co-pending U.S. patent application Ser. No. 14/512,229, filed Oct. 10, 2014, for "Hunger Minimized Juice Fasting System", the disclosure of which is hereby incorporated in its entirety by reference thereto.

1. FIELD OF THE INVENTION

This method relates diet management; and, more particularly, to a fasting method that utilizes juices and vegetable soup to stave off hunger pangs by providing a high sugar and carbohydrate content that satisfies the brain glucose-glycogen need.

2. DESCRIPTION OF THE PRIOR ART

There is a global epidemic of obesity taking place, which leads to several obesity related diseases. There is a strong desire to effectively lose excess body weight. The present invention relates to a fasting method designed to lose excess body weight and body fat, and improve the functionality of critical body organs without creating hunger pants as the duration of fasting effort progresses.

Many patents and prior art documents relate to fasting methods. These methods aim towards reducing the body weight of the fasting person by merely reducing the calorie intake by way of limiting the quantity of food consumed. These methods do not pay attention to body mechanisms that control brain function, the needs of muscle tissues, or the perception of hunger. Restriction of calorie intake generally results in the slowing down of the body metabolism and body quickly adapts to this calorie intake reduction and eliminating non-essential body functions in order to maintain core body functions. When a person exits from the fasting routine, body weight is quickly regained back to its original weight value or that is in excess of the original weight value. Prolonged deliberate fasting generally results in the fasting person feeling extremely tired and unable to move readily. In many cases, the muscle mass in the fasting person's body is consumed to generate the required glucose or glycogen substitute for the brain function, and causes the loss of protein rich muscle tissue which is consumed to produce a glucose substitute that results in the loss of muscle mass, further weakening the fasting person's body.

Generally people discontinue juice fasting routine pretty early in the process due to hunger pangs. They are deprived of energy, which is required for daily activities, or to support tasks that require muscular movement, or to have mental focus required for concentration, and this leads to a rapid failure of the juice fasting attempt. The method detailed herein addresses these issues and provides a unique solution.

U.S. Pat. No. 6,069,131 to Marsh discloses pre-operative beverage composition and method of treatment. This specially formulated beverage composition is designed to be ingested by a pre-operative patient at least about 2 hours prior to administration of anesthesia. The beverage composition is a single-serving volume containing at least about 200 calories, which calories are primarily from a non-protein, non-fat source, such as one or more carbohydrates. The composition includes about 48 grams maltodextrin, about 6 grams fructose and about 6 grams glucose, in water with enough citric acid to provide a final solution pH of about 4.3 This beverage composition, when ingested during pre-operative fasting, at least about 2 hours prior to administration of anesthesia, encourages compliance with pre-operative fasting requirements; reduces the incidence of symptoms associated with prolonged fasting, such as feelings of hunger and thirst, lightheadedness, irritability and headache; and should reduce the risk of aspiration pneumonia by providing a residual gastric volume and gastric pH within generally accepted ranges. Also, contemplated herein is the method of using this beverage composition to increase compliance with pre-operative fasting guidelines and thereby decrease the risk of aspiration pneumonia in the anesthetized/sedated patient. This fasting beverage is designed only for a short time fast of typically two hours before administrating an anesthesia and is not designed for a long time fast typically required for hunger free fasting that reduces body fat and improves body mass index.

U.S. Pat. No. 8,715,742 to Koide disclosed method for reducing weight in a subject. This method is provided for reducing weight in a subject by administering an effective amount of a composition comprising omega-3 polyunsaturated fatty acid (PUFA), at least one of L-arginine, L-ornithine, an L-arginine precursor and an L-ornithine precursor, and at least one of a nucleobase, a nucleoside and a nucleic acid. The method can also be used to treat obesity, hyperlipidemia, diabetes and/or hypertension and for improving diathesis, or treating adult disease or disposition to adult disease. This method does not provide adequate glucose or glycogen required for brain functioning and satiation.

U.S. Pat. No. 7,629,329 to Lee et al. discloses a method for increasing muscle mass and strength through administration of adenosine triphosphate. This method uses compositions that have an effective amount of Adenosine Triphosphate ("ATP") sufficient to increase intracellular and extracellular concentrations of ATP in a mammal to improve anaerobic exercise capacity by increasing muscle size and/or strength. Preferably, a gastric acid secretion inhibitory coating is applied to the effective amount of ATP in a manner that protects the ATP from degradation by gastric juices. ATP compositions may be administered in nutraceutical or functional food dosage forms, including oral and non-oral delivery forms. In addition, the effective amount of ATP may be combined with amino acids, botanicals, functional foods, herbals, nucleotides, nutraceuticals, nutrients, pharmaceuticals, proteins, and/or vitamins in an effort to enhance the targeted activity of the composition. In spite of the coating that protects the ATP from being destroyed by the gastric juices, the ATP levels are not increased for at least about 60 minutes from the time at which the ATP containing composition is consumed as indicated in the figures. The composition does not provide sustained or increased muscle activity after the consumption of the ATP containing composition, rather kicks in only after an hour later.

U.S. Pat. No. 7,825,084 to Harris, et al. disclosed methods and compositions for increasing the anaerobic working capacity in tissues. The composition comprises a beta-alanylhistidine dipeptide and a glycine, an insulin, an insulin mimic, or an insulin-action modifier and administering the composition to the tissue increases beta-alanylhistidine dipeptide synthesis in the tissue, thereby increasing the anaerobic working capacity in the tissue The cause an increase in the blood plasma concentrations of beta-alanine and/or creatine. The composition contains artificial chemicals and does not contain natural ingredients or compounds indicated in the present invention disclosure.

U.S. Pat. No. 7,897,169 to Ueda, et al. discloses ubiquinol-enriched fat containing foods. The process for producing a ubiquinol-enriched oil/fat-containing food product for human ingestion comprises dissolving ubiquinol in oil/fat under heating first followed by cooling to obtain homogenous solution with a melting point of not lower than 20° C. the cooling action solidifying the homogenous composition. The solidified composition is kneaded to form oil-in-water emulsion. The composition formed is not a gel or paste like substance and is not contained in a ready to use individually packed pouches. The composition is oil based, not water based and does not have other nutrients than ubiquinol.

US Patent Application 20110123653 to McKever et al. disclosed compositions and methods for optimizing exercise recovery. The method decreases post-exercise recovery time in a subject using compositions that contain one or more polymethoxylated flavones (PMFs). The composition is an orange peel extract. The post-exercise recovery time is the time for a subject's post-exercise oxygen consumption $VO_2$ to return to a pre-exercise $VO_2$ level. PMF composition is selected from PMFs, which are selected from the group consisting of 5,6,7,3',4'-pentamethoxyflavone (sinensetin); 5,6,7,8,3',4'-hexamethoxyflavone (nobeletin); 5,6,7,8,4'-pentamethoxyflavone (tangeretin); 5-hydroxy-6,7,8,3',4'-pentamethoxyflavone (auranetin); 5-hydroxy-7,8,3',4'-methoxyflavone; 5,7-dihydroxy-6,8,3',4'-tetramethoxyflavone; 5,7,8,3',4'-pentamethoxyflavone; 5,7,8,4'-tetramethoxyflavone; 3,5,6,7,8,3',4'-tetramethoxyflavone; 5,6,7,4'-tetramethoxyflavone; 7-hydroxy-3,5,6,8,3',4'-hexamethoxyflavone; and 7-hydroxy-3,5,6,3',4'-pentamethoxyflavone. This composition merely reduces recovery time and does not increase muscle energy output during exercise. It is not a fasting routine and does not control hunger pangs.

The publication "Brain Glucose Sensing, Counterregulation, and Energy Homeostasis" by Nell Marty, et al. published at PHYSIOLOGY 22: 241-251, 2007 available at web page at http://physiologyonline.physiology.org/content/22/4/241. This publication discloses methods by which the human brain monitors closely the blood glucose as a signal to control feeding behavior and energy expenditure. The glucose sensing neurons are highly represented in hypothalamic nuclei and the brain stem, regions involved in the control of energy homeostasis and food intake. Brain has a very little or no storage of glucose or glycogen and does not have reserve ATP and requires continuous feed of blood glucose for brain operation. Stomach and intestine sense presence of food through Gluco-incretin secretion K-Cells (GIP) L-Cells (GLP-1) of the enteric nervous system.

The Lypolysis and the Oxidation of Fatty Acids by Michael W King is available at http://themedicalbiochemistrypage.org/fatty-acid-oxidation.html and describes a mechanism by which fatty acid is removed from storage and oxidized for liberation of energy at muscles, as well as body cells.

The web page at http://en.wikipedia.org/wiki/Fatty_acid_metabolism discloses that when blood sugar is low, decreasing insulin levels signal the adipocytes to activate hormone-sensitive lipase, and to convert triglycerides into free fatty acids. These free fatty acids have very low solubility in the blood, typically about 1 μM. However, the most abundant protein in blood, serum albumin, binds free fatty acids, increasing their effective solubility to ~ 1 mM. Thus, serum albumin transports fatty acids to organs such as muscle and liver for oxidation when blood sugar is low.

The web page at http://en.wikipedia.org/wiki/Beta_oxidation states that free fatty acids cannot penetrate the plasma membrane due to their negative charge. Once in the cytosol, activation of the fatty acid is catalyzed by long fatty acyl CoA synthetase. A fatty acid reacts with ATP to give a fatty acyl adenylate, plus inorganic pyrophosphate, which then reacts with free coenzyme A to give a fatty acyl-CoA ester plus AMP. If the fatty acyl-CoA has a long chain (10 or more carbons) then it is reacted with carnitine to form acylcarnitine translocase. If the fatty acyl-CoA contains a short chain (less than 10 carbons) it can simply diffuse through the inner mitochondrial membrane.

A number of advertisements relate to fasting, reduction in body weight as well as improvement of high blood pressure, diabetes and other illnesses. These programs do not disclose their methodology or scientific basis for the methods used and expected results as a function of time.

There remains a need in the art for a safe and effective fasting system wherein the person undergoing the fasting procedure does not suffer excessive hunger or loss of muscle tissue without using synthetic medications and can effectively decrease body fat while maintaining full body energy.

SUMMARY OF THE INVENTION

The hunger minimized fasting system of the present invention utilizes a number of natural body processes to allow hunger free fasting without the feeling of hunger pangs for fasting periods lasting from 10 to 90 days. Prior art methods do not allow such prolonged fasts without the feeling of hunger. More importantly, with such prior art methods, the progressive fast decreases body energy available and a person becomes very week and is generally unable to move. By way of contrast, the system of subject invention maintains blood sugar level in the range of 5 to 10 mM (90-180 mg/dL) which satisfies the brain's requirement for a continuous supply of glucose, since the brain does not store much glycogen or ATP. The brain also has sensors in the gut, which sense the presence of solids in the digestive organs and invoke digestive juices, again creating hunger pains. The absence of solids in the juices or soups used during fasting, which include fruit juices of various fruits and vegetable soup that is filtered of all solids, suppresses the brain generated hunger sensation and maintains satiety during prolonged fasting. Entering the fasting phase requires a pre-fast phase of 3 to 5 days wherein only fruits are consumed in the morning followed by raw vegetables in the evening, again restricting overall calorie intake. The body quickly learns to extract nutrients from this diet and is now ready for entering the fasting stage.

The fasting stage comprises the inclusion of liquefied vitamins and minerals essential for producing all the enzymes and hormones needed to assimilate blood glucose created from the consumption of sugar or carbohydrate rich juices and soups. Since the calorie intake is deficient by about 600 to 1400 calories as compared to the required daily calorie requirement, fat reserves are used to generate sufficient calories for the daily functioning of the body with the help of hormone sensitive lipase.

The fasting step involves consumption of 8 to 12 ounces of various clear fruit juices and solid free prepared vegetable soups every 2 to 4 hours representing a caloric intake of 800 to 1200 calories only, which is deficient by about 600 to 1400 calories on a daily basis. The consumption of the juices results in a steady blood glucose level of 5 to 10 mM (90-180 mg/dL) satisfying the brain's glucose need; the absence of solid material in the digestive track does not invoke the brain hunger response; and the fasting person remains satisfied throughout the fasting period. The brain does not demand release of glycogen stored in the muscles and liver, a step that generally results in the weakening of the fasting person. If blood glucose is not available, the brain will demand the liver to attack muscle tissue that is in contact with blood to convert the muscle to glucose simulant releasing nitrogen rich waste. Eating protein or meat does not solve this problem since the eaten food is not in contact with blood. The technology of the subject invention avoids all these problems brain demanding extraction of glycogen from muscles and liver or the degradation of muscle tissue. The system of the present invention maintains a consistent blood glucose level.

The blood glucose from the consumption of juices and soups is converted to pyruvic acid and two ATP molecules in the extramitochondrial portion of the cell by the glycolysis process as detailed below. This process is anaerobic and does not care if oxygen is present or not. The pyruvic acid reacts with coenzyme A in the presence of pyruvic acid dehydrogenase enzyme using a molecule of ATP creating Acetyl CoA that enters the inner barrier of the mitochondria undergoing TCA cycle, which produces many molecules of ATP. TCA cycle occurs aerobically within the mitochondria, which has all the enzymes needed for TCA cycle except succinate dehydrogenase.

Due to the combination of a reduced caloric intake and the brain having sufficient blood glucose levels, the only way the body can get adequate calories is by reaching out to consume stored fat tissues. Hormone sensitive lipase extracts fat from storage with the help of adrenalin hormone and is bound to blood serum albumin proteins and transported to cells and arrives at the extramitochondrial portion of the cell. Due to their negative charge these fats cannot enter the inner mitochondrial barrier. Once in the cytosol of the cell, activation of the fatty acid is catalyzed by long fatty acyl CoA synthetase. A fatty acid reacts with ATP to give a fatty acyl adenylate, plus inorganic pyrophosphate, which then reacts with free coenzyme A to give a fatty acyl-CoA ester plus adenosine monophosphate (AMP), precursor to ATP. If the fatty acyl-CoA has a long chain (10 or more carbons) then it is reacted with carnitine to form acylcarnitine, which is transported across the inner mitochondrial membrane by a Carnitine-acylcarnitine translocase. The acyl-CoA and adenosine monophosphate (AMP), precursor to ATP undergo TCA cycle producing large number of ATP molecules.

Thus the technology of the subject invention uses body's metabolic processes to force the extraction of stored fat and conversion to ATP energizing body cells. The key feature is the presence and accumulation of ATP formed by the glycolysis process in the extramitochondrial portion of the cell. From blood glucose, the glycolysis process produces ATP and pyruvic acid, which is converted to Acetyl CoA that enters the inner mitochondria barrier as stated above. The fat molecules from fat storage are released into the blood stream by hormone sensitive lipase with the help of adrenalin hormone and transported bound to serum albumin arriving at the extramitochondrial portion of the cell, the very place where glycolysis produces ATP and is readily available. Once in the cytosol, activation of the fatty acid is catalyzed by long fatty acyl CoA synthetase. The fatty acid reacts with ATP to give a fatty acyl adenylate, plus inorganic pyrophosphate, which then reacts with free coenzyme A to produce a fatty acyl-CoA ester plus adenosine monophosphate (AMP), precursor to ATP. If the fatty acyl-CoA has a long chain (10 or more carbons) then it is reacted with carnitine to form acylcarnitine, which is transported across the inner mitochondrial membrane by a Carnitine-acylcarnitine translocase. During beta oxidation within mitochondria, acyl-CoA ester is produced and undergoes TCA cycle creating many molecules of ATP. If ATP is absent, the fat in the form of triglycerides and monoglycerides cannot enter the mitochondrial inner barrier and are returned back to storage. Thus the presence of ATP produced by glycolysis of sugar and carbohydrate rich juices and soups is essential for the metabolism of fats in the mitochondria. This is the mechanism by which both sugar and fat are converted to ATP in the TCA cycle producing large number of ATP molecules. This is the central feature of the invention.

The initial preparation before entering fasting is carefully planned to reduce the amount of solid material entering the digestive elements of the body gradually. Consuming fruits do this in the morning followed by consuming raw uncooked vegetables at night for a period of 3 to 5 days. During this initial period 8 to 12 ounce sugar rich juices can be consumed every 4 hours to sustain hunger response. At the end of the 3 to 5 days of initial preparation, fasting may begin.

The fasting procedure involves use of clear juices, including: orange juice, apple juice, pineapple juice, grape juice, pomegranate juice, coconut water, watermelon juice, cantaloupe juice, carrot juice, beetroot juice, celery juice, or combinations thereof, which are filtered using a very fine mesh cloth or sieve which filter out all solid residues present in the juice. In addition to the juices prescribed herein, a nutrient rich soup or extract of vegetables may be used to increase the intake of vitamins and minerals present in natural vegetables. The soup is prepared by slicing small pieces of carrots, broccoli, beets, celery, potatoes, sweet potatoes and other vegetables that is cooked in water without any additional salt and simmered for a period of 30 minutes in low heat of about 80° C. to 95° C. This reduced temperature cooking preserves vitamins and minerals. The soup is cooled to room temperature and all the solid materials is filtered out and discarded. The soup thus created is stored in in a refrigerated container for use during fasting. Preferably ever fasting day is started and finished by the consumption of the nutrient rich vegetable soup, which reduces the onset of hunger pangs. The soup is supplemented with liquefied vitamin and brings in essential vitamins and minerals into the body of the person practicing fasting. Throughout the day filtered juices of various types are consumed typically in 2 to 4 hour intervals. Even within the very first day of fasting, surprisingly, the hunger response subsides rapidly and hunger pangs are minimized or eliminated. Prior to going to bed, the liquified vitamin and mineral supplement is mixed with soup and is consumed. The procedure is repeated for as many days as a person practicing fasting desires to move forward. Typically people practice as detailed below fasting for 10 to 90 days easily to realign their body and reduce body weight to improve body mass index (BMI). On each day, a fasting person loses typically between about one half to one pound each day without feeling hunger pangs. This number of fasting days can be extended to 120 days.

Briefly stated, the invention includes using sugar and carbohydrate rich juices and soups free of solid to bring the blood glucose level at a consistent level of 5 to 10 mM (90-180 mg/dL) so that blood glucose level detectors at brain hunger at hypothalamus and brain stem are satisfied and brain does not order the release of stored glycogen from muscles and liver enabling the muscles to work without being tired. Due to the presence of stable blood glucose levels, the brain does not order the muscles to be degraded by liver enzymes to release sugar like products into the blood stream saving the muscle mass. Since the fasting person does not perceive hunger, the fasting can be continued for long durations like 90 days easily without feeling of hunger, deprivation or feelings of muscle weakness and tiredness. The hunger free fasting may be conducted for a number of days at the fasting person's home or in a fasting center or a hospital.

Significant advantages are realized by practice of the present invention. In a preferred embodiment, the hunger minimized fasting system of the present invention comprises:

1) preparing fasting person for 3 to 5 days prior entering fasting phase;
2) providing liquefied vitamin and mineral supplement on a daily basis enabling production of numerous enzymes for use in glycolysis, the process of conversion blood glucose to pyruvic acid and adenosine triphosphate (ATP) as well as beta oxidation of fats in the TCA (Kreb) cycle;
3) consuming on a daily basis clear solid free vegetable soup of 8 to 12 ounces in the morning and before bed time and consuming juices every 2 to 4 hours during waking hours representing a caloric intake of only 800 to 1200 calories representing a deficit of 600 to 1400 calories maintain blood glucose levels in the range of 5 to 10 mM (90 to 180 mg/dL) preventing onset of hunger sensing mechanism present in the brain hypothalamus and brain stem preventing or minimizing hunger sensation of the fasting person and the blood glucose entering anaerobic glycolysis process synthesizing pyruvic acid and two ATP molecules in the extramitochondrial portion of the cell;
4) absence of solid material in the digestive organs including stomach and intestine reducing or eliminating response from brain hunger sensing mechanism of gut sensors and hormones by K-cells and L-cells;
5) said reduction in caloric intake with blood sugar levels maintained in the satiety region causes fat molecules from fat storage to be released into the blood stream by hormone sensitive lipase with the help of adrenalin hormone and transported bound to serum albumin arriving at the extramitochondrial portion of the cell the very place where glycolysis produces ATP and is readily available, fatty acid reacts with ATP to give a fatty acyl adenylate, plus inorganic pyrophosphate, which then reacts with free coenzyme A to produce a fatty acyl-CoA ester plus adenosine monophosphate (AMP), precursor to ATP which enters the inner barrier of the mitochondria with the help of carnitine to form acyl-carnitine during beta oxidation to produce acyl-CoA ester that undergoes TCA cycle with the mitochondria and producing many molecules of ATP, the essential constituent for all cell operations; and
6) exiting the fast follows the same procedure as the fast entry phase, but adding additional insoluble fibers such as whole flax seeds, chia seeds or bran flakes as well as adding pro-biotic microbes to adjust the digestive system into re-accepting solids;

whereby said brain hunger sensing mechanism is minimized or prevented and glycogen is not depleted from muscles and liver allowing movement and exercise of the fasting person while all the muscle tissue are preserved from any muscle degradation.

BRIEF DESCRIPTION OF THE DRAWINGS

The invention will be more fully understood and further advantages will become apparent when reference is had to the following detailed description of the preferred embodiments of the invention and the accompanying drawings, in which:

FIGS. 2A-1 and 2A-2 illustrate the steps of the Preparatory Phase of Glycolysis that occurs in the extramitochondrial portion of the cell showing loss of 2 ATP molecules;

FIGS. 2B-1 and 2B-2 illustrate the steps of the Pay-off Phase of Glycolysis that occurs in the extramitochondrial portion of the cell showing gain of 4 ATP molecules;

DETAILED DESCRIPTION OF THE INVENTION

Figure 1:
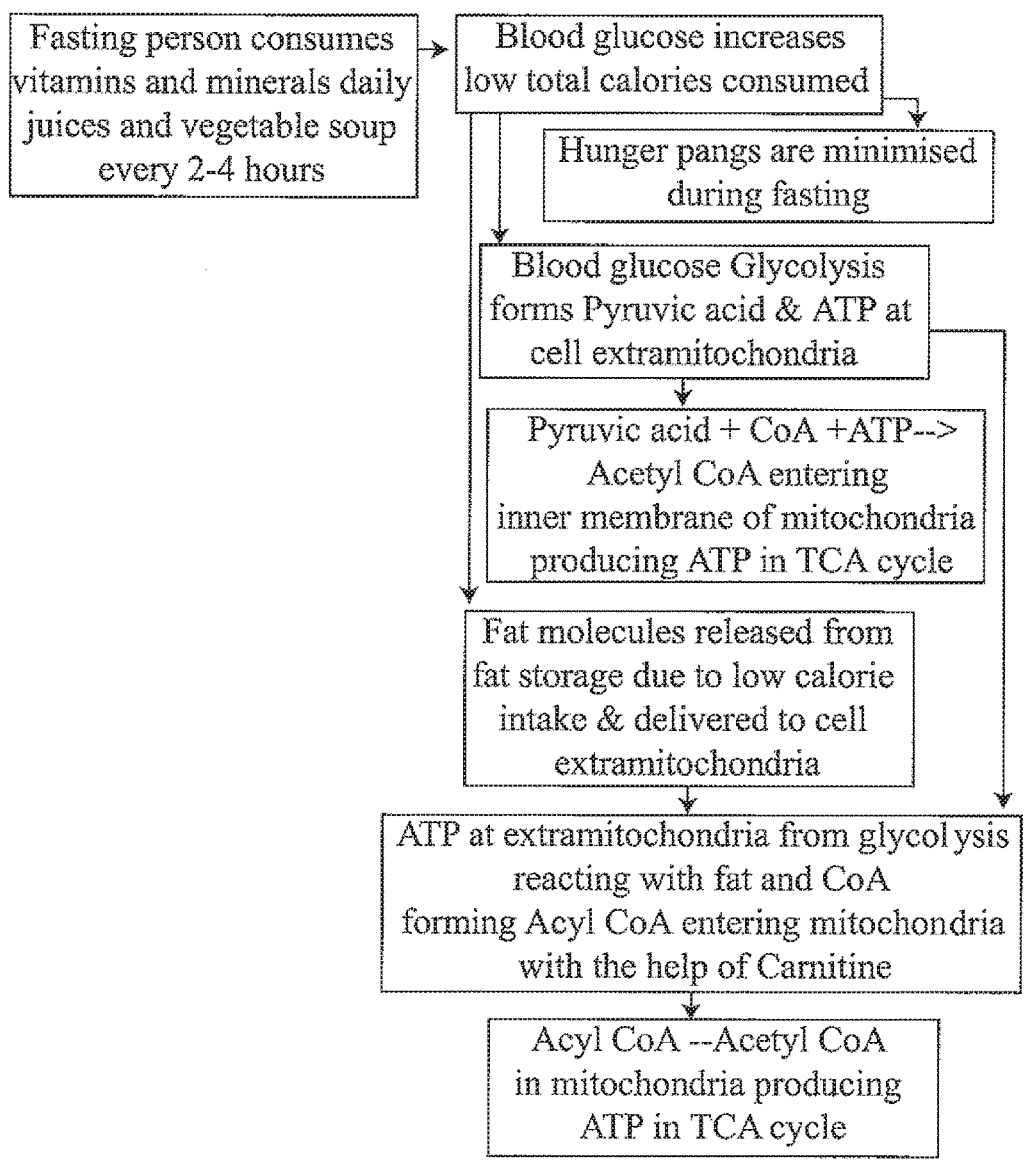
FIG. 1 illustrates the key features of the present invention wherein ATP is available at the extramitochondrial portion of the cell due to glycolysis of sugars and carbohydrates consumed and the fats also arrive at the same location allowing decomposed products of glycolysis and fat enter the mitochondria due to the presence of ATP.

This invention relates to a system for fasting during a prolonged period without hunger pangs and without becoming very tired or unable to move and exercise. The system also prevents the loss of muscle tissue while losing a significant amount of body weight which includes fat and water, on a daily basis, typically in the range of half to one pound.

The present invention employs a unique approach during juice fasting that provides benefits to the person undergoing the procedure. It was surprisingly found that the degree of hunger perceived during juice fasting is dependent on numerous brain hunger sensing functions. The brain tissue has very little storage of glucose or glycogen or adenosine triphosphate (ATP) molecules and requires a continuous supply of glucose for functioning of the brain at about 5 mM or 90 mg/dL. As a primary sensing mechanism, the hypothalamus and brain stem monitors very closely the blood glucose or glycogen levels and provides strong hunger sensations when the blood glucose or glycogen levels are low, creating a strong urge to eat. If the glucose or glycogen levels are not replenished, the brain commands the muscles and liver to release stored glycogen into the blood stream. If this stored glycogen is unavailable the brain commands the liver to degrade muscles to produce glucose simulant at the expense of normally unused muscle tissue. Again, when the blood glucose or glycogen levels are high the insulin release is triggered converting the glucose or glycogen in the blood to be combined to form triglycerides which are transferred for storage as adipose tissue. In addition, the fat release mechanism is immediately stopped when blood glucose concentration is too high. Thus the key to hunger free fasting is to provide an adequate amount of blood glucose or glycogen levels to satisfy the brain's need for glucose without exceeding glucose levels that trigger a release of insulin resulting in the formation of triglycerides. Also, when high blood glucose levels are present, the release mechanism from fat storage is halted. The second key hunger sensing mechanism used by the brain is the detection of digestible material in the stomach and intestine promoting release of digestive enzymes as detailed in the article on "Brain Glucose Sensing, Counterregulation, and Energy Homeostasis" by Nell Marty, Michel Dallaporta and Bernard Thorens published in Physiology 22:241-251, 2007 available at http://physiologyonline.physiology.org/content/22/4/241. This requires the stomach and intestines to be free from solid material preventing hunger response and corresponding release of digestion hormones. The reference 78, Mei N. Vagal 'glucoreceptors in the small intestine of the cat'. J Physiol 282: 485-506, 1978 relates to solids available at the intestines.

Thus the strategies for hunger free fasting involve drinking cooked vegetable soup that is filtered of all solid material and 8 to 12 ounce of juice every 2 to 4 waking hours. Breakfast and pre-bedtime meal is essentially the vegetable filtered soup. The overall calories contained in the juice and vegetable soup is only in the range of 800 to 1200 calories leaving a calorie deficit of about 600 to 1400 calories for a person normally consuming 1800-2400 calories per day.

The body requires these calories for the functioning of essential body functions including breathing, supporting the liver, heart and lung function as well as maintaining body temperature. This calorie deficiency has to be made up by use of body fat since fat is the primary fuel used by the body for all aerobic muscles, which contain fat burning brown muscle fibers interlaced with capillaries supplying blood oxygen rich blood. All cells and muscles performing steady work such as heart muscles and muscles that provide body stability are all aerobic muscles of this type. The next aspect of the present invention is to facilitate the release of fat in the form of tri-glycerides or mono-glycerides from lipid storage.

The food consumed, whether in the form of carbohydrates or sugars, converts to glucose in the blood stream either rapidly or slowly depending on the glycemic index of the food consumed. Proteins are more slowly digested and also convert to glucose in the blood stream. Fats take a very long time to digest and enter the intestinal walls after enzyme action that breaks down fat into tri or mono glycerides. Fats do not convert to glucose in the blood stream.

Since the amount of food in the stomach and intestine is reduced the ability to eliminate waste is minimized. Enemas or suppositories may be used to improve evacuation.

The utilization and conversion of glucose and fats into adenosine triphosphate (ATP) through different initial pathways as detailed in FIGS. 1A-1, 1-A-2, 1B-1 and 1B-2 are shown. The TCA cycle is illustrated in FIG. 2 which produces ATP in aerobic conditions.

FIG. 1 illustrates a block diagram of the features of the subject invention. When the fasting person consumes a sugar rich and or carbohydrate rich juice or soup, the brain detection of hunger is satiated. This blood glucose is processed by glycolysis, which produces two pyruvic acid molecules and two ATP molecules per molecule of glucose. The pyruvic acid reacts with coenzyme A aided by ATP to produce acetyl CoA, which enters the mitochondria and undergoes TCA cycle producing a number of ATP molecules powering the cell operation. Since the amount of calories consumed by this juice and soup diet is smaller than that is required for the sustenance of the body, the deficient calories are obtained from fats. Hormone sensitive lipase is released at the fat reserves as mono and triglycerides and carried by the blood bound to serum albumen and delivered at the extramitochondrial portion of the cell. The released fat in the extramitochondrial region of the cell reacts with coenzyme A assisted by energy rich ATP molecule to form acyl CoA which enters the inner barrier of mitochondria assisted by carnitine. Within the mitochondria the acyl CoA converts to acetyl CoA, by the process known as beta oxidation, which is passed on to the TCA cycle producing a large number of ATP molecules. The key feature of the invention is making ATP available at all times due to consumption of sugar and carbohydrate rich juices and or soups every two to 4 hours while at the same time limiting the total caloric intake so as to force the body to release fat from storage. The fat arrives at the extramitochondrial portion of the cell and is again processed due to the presence of ATP at this location. The fasting person does not feel hungry even after fasting for a number of days and the fat is drawn from fat reserves and used as calories, improving the weight and BMI of the person. The muscles of the fasting person are not degraded during fasting.

Figure 2A:
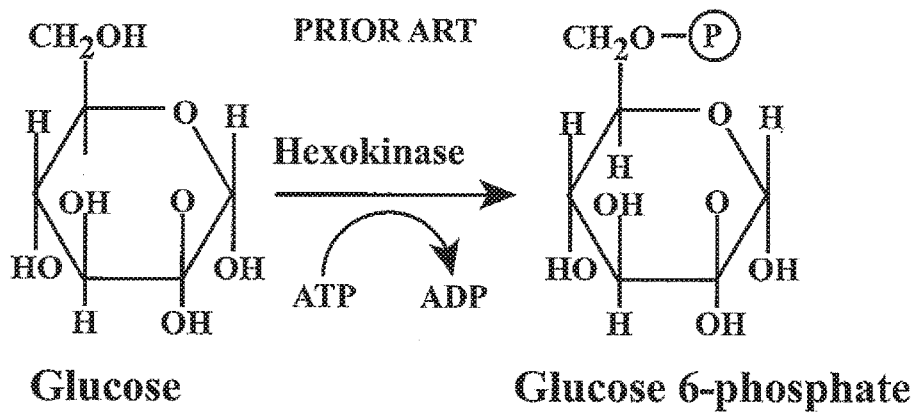
Figure 1:
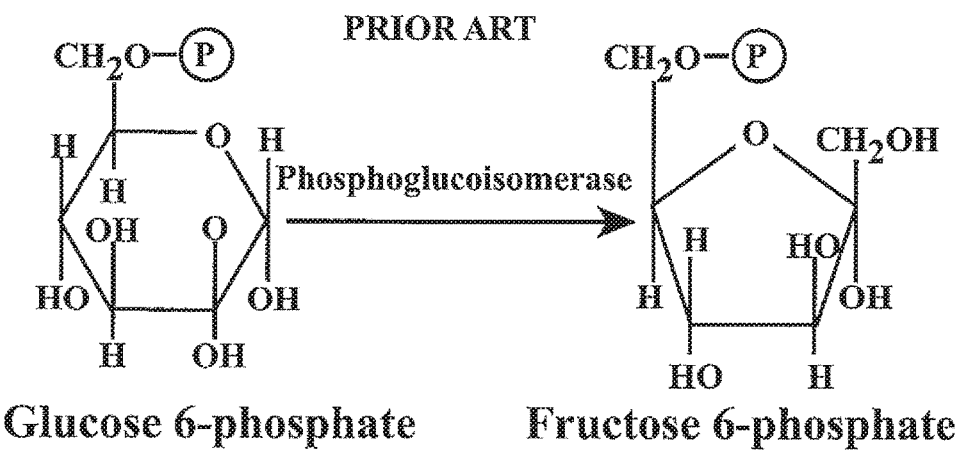
Figure 2A:
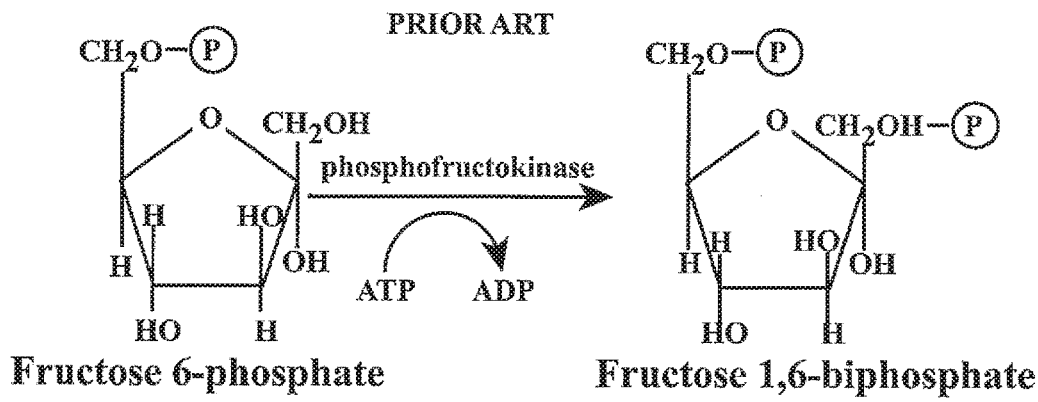
Figure 2:
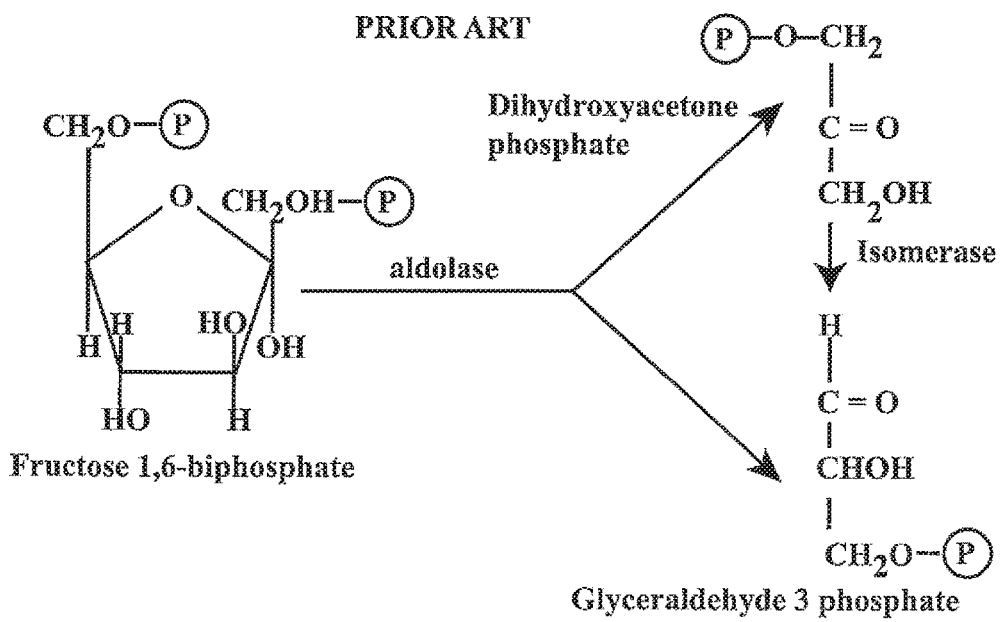

FIGS. 2A-1 and 2A-2 illustrates the preparatory phase of glycolysis where two ATP molecules are consumed as shown in Steps 1 and 3. A large number of enzymes are involved in Steps 1 through 5 of the preparatory phase each performing a specific function.

Figure 2B:
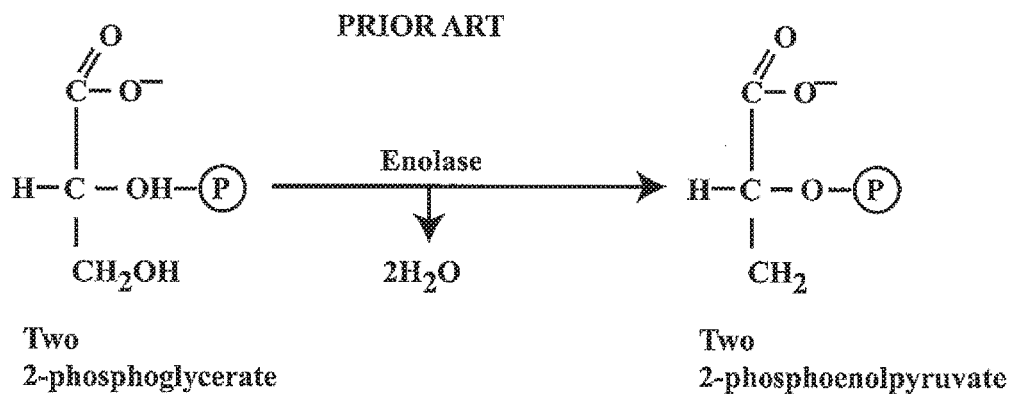
Figure 2:
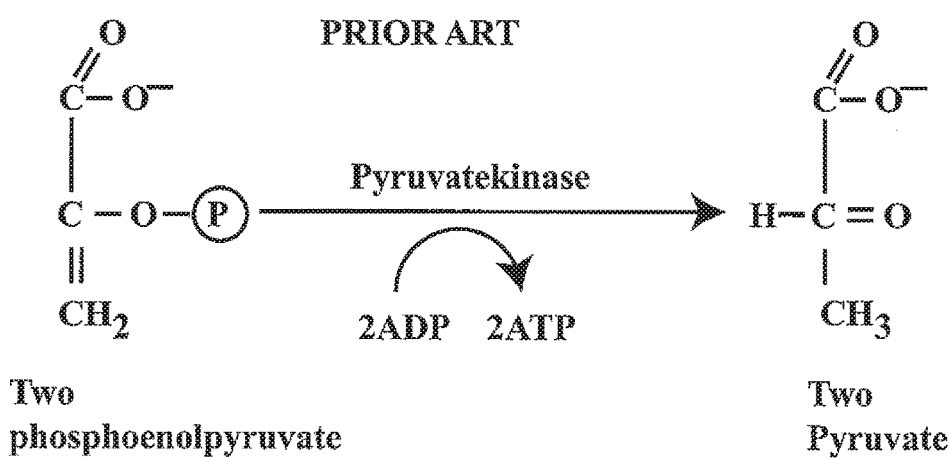

FIGS. 2B-1 and 2B-2 illustrates the pay-off phase of glycolysis where four ATP molecules are produced as shown in Steps 7 and 10. Thus the glycolysis, which is a combination of steps 1 through 10 produce two excess molecules of ATP. A large number of enzymes are involved both in the preparatory and payoff phases each performing a specific function.

Glycolysis is an anaerobic metabolic pathway that has a sequence of 10 steps all of which are enzyme catalyzed. Accordingly, the sequence of these reactions converts glucose into pyruvate, producing two additional ATP molecules from each glucose molecule. This metabolic process produces high-energy compounds of ATP (adenosine triphosphate) and NADH (nicotinamide adenine dinucleotide). This process is an anaerobic reaction; the presence or absence of oxygen does not alter the reaction. The process of glycolysis happens in the extramitochondrial portion of the cell, often referred to as the EMP pathway. Glucose undergoes partial oxidation to produce two molecules of pyruvic acid, which is the starting point of the tri-carboxylic acid cycle (TCA cycle), which is also known as the citric acid cycle or Kreb cycle. The TCA cycle takes place aerobically within the mitochondria portion of the cell. All these processes of glycolysis and the TCA cycle require a large number of enzymes which are all synthesized by the cells and liver.

Figure 3:
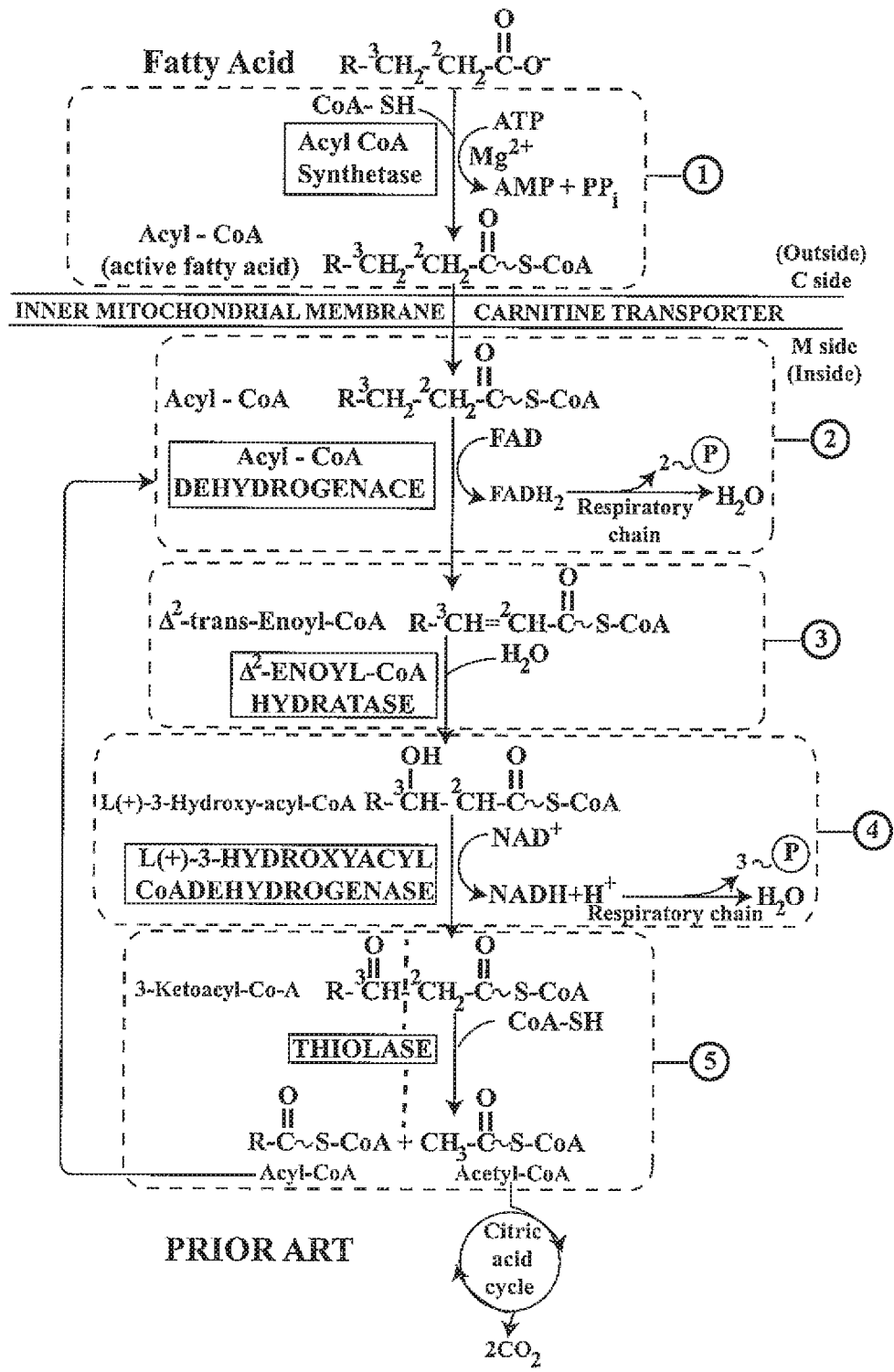
FIG. 3 illustrates the beta oxidation of fat brought onto a cell that occurs within the mitochondrial portion of the cell.

FIG. 3 illustrates the beta oxidation of fatty acids taken from slide number 29 of web page http://www.authorstream.com/Presentation/aSGuest38680-330425-beta-oxidation-lipids-education-ppt-powerpoint. Beta oxidation of fatty acids is shown in this figure. Long chain acyl-CoA is cycled through reactions 2 through 5. Acyl-CoA is split off by thiolase as shown at reaction 5. ATP is needed for the first step of the beta oxidation process outside the inner mitochondrial membrane as shown. Carnatine is needed for the entry of acyl-CoA into the inner mitochondrial membrane. The fatty acid is degraded to acetyl CoA and enters the citric acid cycle as shown. All the enzymes used outside the inner mitochondrial membrane have to be manufactured by liver and the cell.

Figure 4:
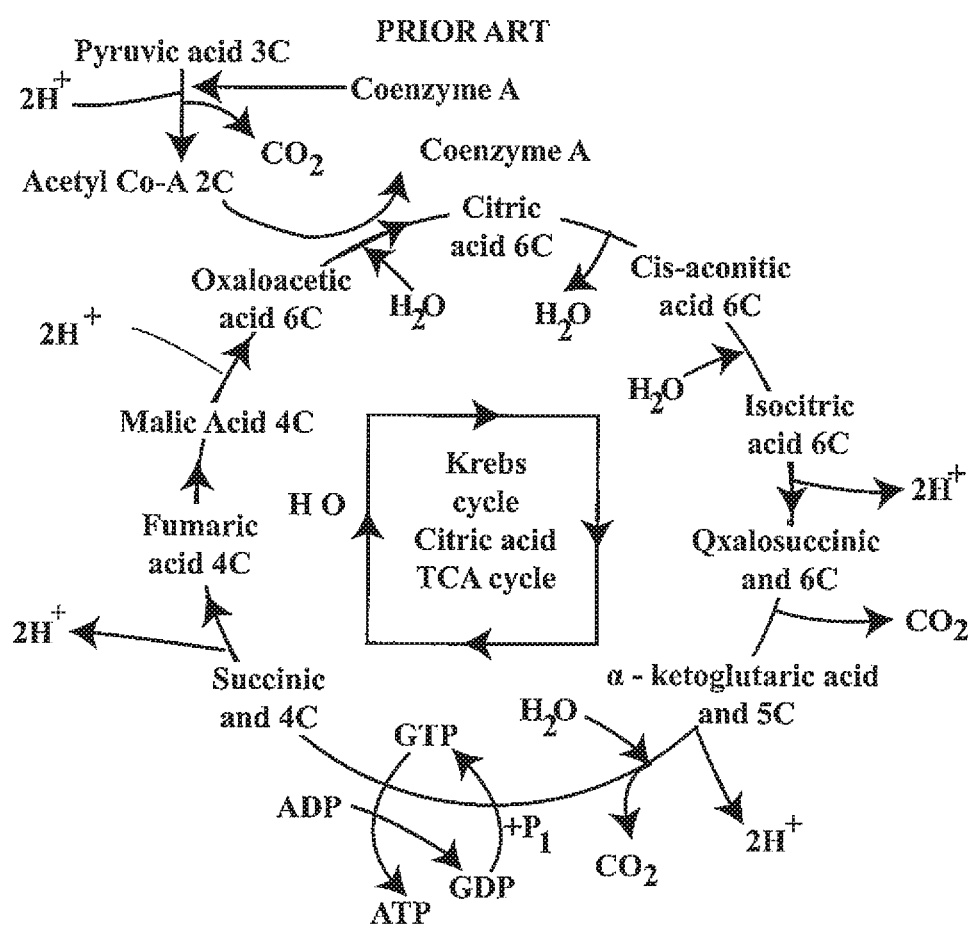
FIG. 4 illustrates the TCA cycle that occurs within the mitochondrial portion of the cell.

FIG. 4 illustrates the TCA cycle. This TCA cycle is detailed at the web page http://biology.tutorvista.com/cell/glycolysis.html. The citric acid cycle is a sequence of enzyme-catalyzed chemical reactions, which are used by all the aerobic organisms to produce energy. Energy is generated through the oxidation of acetate that is derived from carbohydrates, fats and proteins into carbon dioxide. Pyruvate molecules are created from glycolysis. In the presence of oxygen, pyruvate produces acetyl-CoA by reaction with coenzyme A consuming one ATP. The fats are also degraded to acetyl-CoA and brought into the mitochondria. In the presence of oxygen, the acetyl-CoA produced by glycolysis or fat degradation enters the citric acid cycle inside the matrix of the mitochondria and it gets oxidized to $CO_2$, and also at the same time reduces NAD to NADH. $H_2O$ and $CO_2$ are the waste products created during this cycle. The cycle consists of eight steps, which are catalyzed by eight different enzymes. The steps are detailed below.

Step 1: Synthesis of Citric Acid. This step of the Krebs cycle is an Aldol condensation reaction and it is an irreversible reaction. Oxaloacetic acid and the acetyl CoA condense to form citric acid in the presence of the enzyme citrate synthase. The net effect of this reaction is to join a two-carbon with a four-carbon molecule, which yields a six-carbon molecule which is the citric acid. This is called the synthesis of citric acid.

Step 2: Dehydration of citrate. It is a reversible reaction. Under the action of the enzyme acotinase, citrate is isomerized to form isocitrate.

Step 3: Oxidation and Decarboxylation of isocitrate. This reaction is catalyzed by the enzyme isocitrate dehydrogenase. This is an irreversible reaction where isocitrate undergoes oxidative decarboxylation yielding three NADH molecules. These are first NADH molecules produced in the cycle and also $CO_2$.

Step 4: Oxidative, decarboxylation of α-ketoglutarate The enzyme α-ketoglutarate dehydrogenase complex catalyzes the conversion of α-ketoglutarate to succinyl CoA. This reaction produces the second $CO_2$ and also the second NADH of the cycle. The coenzymes that are required in the reaction are thiamine pyrophosphate, lipoic acid, FAD, NAD+ and CoA.

Step 5: Substrate level phosphorylation. This reaction is catalyzed by the enzyme succinyl-CoA synthetase. This reaction is exothermic and is GTP molecule, which is equivalent to ATP is generated in this reaction. The product of this reaction is succinic acid and GTP.

Step 6: Oxidation. This reaction is catalyzed by the enzyme succinate dehydrogenase. In this reaction the final electron acceptor is the FAD coenzyme. This reaction yields two ATP molecules from the electron transport chain.

Step 7: Hydration. The hydration reaction is catalyzed by the enzyme fumarase. The fumarate is hydrated to form L-Malate.

Step 8: Oxidation. This is reversible reaction, catalyzed by the enzyme malate dehydrogenase. The malate is oxidized to form oxaloacetic acid. This is the final point of entry to the electron transport chain. This reaction generates the NADH and oxaloacetate.

Accordingly one pyruvic acid molecule yields one ATP molecule and one GTP molecule, which is equivalent to ATP. Also, NADH is an energetic molecule capable of producing ATP.

As indicated in http://en.wikipedia.org/wiki/Beta_oxidation a fat molecule produces a large number of ATP molecules. The ATP yield for every oxidation cycle is theoretically at maximum yield of 17, as NADH produces 3 ATP, $FADH_2$ produces 2 and a full rotation of the Citric Acid Cycle produces 12. In practice it's closer to 14 ATP for a full oxidation cycle as in practice the theoretical yield isn't attained, it's generally closer to 2.5 ATP per NADH molecule produced, 1.5 for each $FADH_2$ molecule produced and this equates to 10 ATP molecules per cycle of the TCA (according to the P/O ratio).

As detailed at http://en.wikipedia.org/wiki/Beta_oxidation, beta-oxidation is the process by which fatty acid molecules are broken down in the mitochondria to generate acetyl-coA, which enters the citric acid cycle, and NADH and $FADH_2$, which are used by the electron transport chain. Fatty Acid Catabolism involves three stages. The first stage of fatty acid catabolism is Beta-Oxidation. The second stage is acetyl CoA oxidation to carbon dioxide. The third stage is electron transfer from electron carriers to the electron transfer chain. Priming the fatty acid for oxidation is the 'Carnitine Shuttle'. First Acyl CoA is transferred to the hydroxyl group of carnitine by carnitine palmitoyltransferase 1 (palmitoyltransferase) located on the outer mitochondrial membrane. Acylcarnitine is shuttled inside by a carnitine-acylcarnitine translocase. Acylcarnitine is converted back to acyl CoA by carnitine acyltransferase (palmitoyltransferase) located on the inner mitochondrial membrane. The liberated carnitine returns to the cytosol for further transport of fatty acid.

Once the fatty acid is inside the mitochondrial matrix, Beta Oxidation can begin. It has 4 steps. Step 1 of Beta-Oxidation: Long chain fatty acid is dehydrogenated to create a trans double bond between C2 and C3. This is catalyzed by the fatty acyl CoA dehydrogenase to produce trans-delta 2-enoyl CoA. It uses FAD as an electron acceptor and it is reduced to $FADH_2$. Step 2 of Beta-Oxidation; Trans-delta$_2$-enoyl CoA is hydrated at the double bond to produce L-B-hydroxyacyl CoA. This is catalyzed by enoyl CoA hydratase. Step 3 of Beta-Oxidation: L-B-hydroxyacyl CoA is dehydrogenated again to create B-ketoacyl CoA by B-hydroxyacyl CoA dehydrogenase. This enzyme uses NAD as an electron acceptor. Step 4 of Beta-Oxidation: Thiolysis occurs between C2 and C3 (alpha and beta carbons) of B-ketoacyl CoA. Thiolase enzyme catalyzes the reaction when a new molecule of coenzyme A breaks the bond by nucleophilic attack on C3. This releases the first two carbon units, as acetyl CoA, and a fatty acyl CoA minus two carbons. The process continues until all of the carbons in the fatty acid are turned into acetyl CoA. Acetyl CoA is the starting point for the TCA cycle as shown above.

The following examples are presented to provide a more complete understanding of the invention. The specific techniques, conditions, materials, proportions and reported data set forth to illustrate the principles and practice of the invention are exemplary and should not be construed as limiting the scope of the invention.

The fasting program of the subject invention can be practiced for a long time without hunger pangs, loss of muscle as detailed in actual test case results.

Example 1

The first test subject is male 40 years old who conducted a fasting study by fasting for 11 weeks followed by monitoring the body for 12 additional weeks following the fast. The following table 1 details the results. The fast was started on Jun. 8, 2013 and terminated on Aug. 17, 2013 representing a weight loss of (84-68) or 16 kilograms or 35 pounds. The measured fat percentile, as measured at a professional gym, decreased from 18% at the start of the fast to 5% at the end of the 70-day fast. Having changed the eating habits due to this prolonged fast, the weight and body fat contained remained stable as shown in the table. The percent of muscle during fast did not decrease, but increased as shown due to loss of body weight and remained stable for the 12 weeks after ending the fast.

TABLE 1

| Date | Week # | Kg | Lbs | Body fat kg | % fat | Body muscle kg | % muscle |
|---|---|---|---|---|---|---|---|
| Begin Fast | | | | | | | |
| Jun. 8, 2013 | 1 | 84 | 184.8 | 15.1 | 18% | 39.4 | 47% |
| Jun. 15, 2013 | 2 | 81 | 178.2 | 12.2 | 15% | 39.3 | 49% |
| Jun. 22, 2013 | 3 | 77.1 | 169.6 | 8.3 | 11% | 39.3 | 51% |
| Jun. 29, 2013 | 4 | 76 | 167.2 | 7.5 | 10% | 39.1 | 51% |
| Jul. 6, 2013 | 5 | 74.1 | 163.0 | 6.9 | 9% | 38.2 | 52% |
| Jul. 13, 2013 | 6 | 72.6 | 159.7 | 4.8 | 7% | 38.5 | 53% |
| Jul. 20, 2013 | 7 | 71.5 | 157.3 | 4.6 | 6% | 38 | 53% |
| Jul. 27, 2013 | 8 | 69.7 | 153.3 | 4.9 | 7% | 36.8 | 53% |
| Aug. 3, 2013 | 9 | 69.5 | 152.9 | 4.1 | 6% | 37.1 | 53% |
| Aug. 13, 2013 | 10 | 67.7 | 148.9 | 3.3 | 5% | 36.5 | 54% |
| Aug. 17, 2013 | 11 | 68 | 149.6 | 3.5 | 5% | 36.3 | 53% |
| End Fast | | | | | | | |
| Aug. 24, 2013 | 12 | 69.1 | 152.0 | 2.8 | 4% | 37.1 | 54% |
| Sep. 1, 2013 | 13 | 70.3 | 154.7 | 2.8 | 4% | 38 | 54% |
| Sep. 8, 2013 | 14 | 70.4 | 154.9 | 3.1 | 4% | 38 | 54% |
| Sep. 14, 2013 | 15 | 70.6 | 155.3 | 3.4 | 5% | 37.9 | 54% |
| Sep. 21, 2013 | 16 | 70.5 | 155.1 | 3 | 4% | 38.2 | 54% |
| Sep. 18, 2013 | 17 | 72.3 | 159.1 | 2.3 | 3% | 39.6 | 55% |
| Oct. 5, 2013 | 18 | 72.6 | 159.7 | 2.7 | 4% | 39.6 | 55% |
| Oct. 12, 2013 | 19 | 72.4 | 159.3 | 3.7 | 5% | 39 | 54% |
| Oct. 19, 2013 | 20 | 72.4 | 159.3 | 3.4 | 5% | 39.1 | 54% |
| Oct. 27, 2013 | 21 | 72.9 | 160.4 | 3 | 4% | 39.9 | 55% |
| Nov. 2, 2013 | 22 | 73.1 | 160.8 | 2.8 | 4% | 39.9 | 55% |
| Nov. 9, 2013 | 23 | 73.6 | 161.9 | 3.4 | 5% | 39.9 | 54% |

Example 2

A second subject is a 70 year old male that conducted a fasting study for 17 days. The daily weight data is shown in Table 2. The first three days represent the pre fast period and fasting is done for 8 days. The next three days were spent readjusting to a normal diet. Even this short fast resulted in a weight loss of (171-158.8) or 12.2 pounds. During fasting it was clearly apparent that exercise could be done.

TABLE 2

| Date | day # | Pounds | Jog/walk distance (mi) |
|---|---|---|---|
| Pre-Fast | | | |
| Jun. 11, 2014 | 1 | 171 | 2.5 |
| Jun. 12, 2014 | 2 | 169 | 2.5 |
| Jun. 13, 2014 | 3 | 168 | — |
| Begin Fast | | | |
| Jun. 14, 2014 | 4 | 167 | 2.5 |
| Jun. 15, 2014 | 5 | 166 | 8.0 |
| Jun. 16, 2014 | 6 | 165.2 | 2.5 |
| Jun. 17, 2014 | 7 | 163.8 | 3.5 |
| Jun. 18, 2014 | 8 | 163.2 | 3.4 |
| Jun. 19, 2014 | 9 | 161.2 | 3.8 |
| Jun. 20, 2014 | 10 | 160.4 | 3.4 |
| Jun. 21, 2014 | 11 | 158.8 | 5.2 |
| End Fast | | | |
| Jun. 22, 2014 | 12 | 158.8 | 2.5 |
| Jun. 23, 2014 | 13 | 159.4 | 2.5 |
| Jun. 24, 2014 | 14 | 159.4 | 2.5 |
| Jun. 25, 2014 | 15 | 161.0 | 3.0 |
| Jun. 26, 2014 | 16 | 161.5 | 2.5 |
| Jun. 27, 2014 | 17 | 162.4 | 2.0 |

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A method for hunger minimized fasting, comprising:
preparing a person's body for 3 to 5 days prior to entering a fasting phase by consuming only fruits in the morning and mid-day, then switching over to consuming raw vegetables in the evening and prior to bedtime;
preparing solid free clear nutritional fruit juice and solid free clear nutritional vegetable soup, comprising:
  i. preparing the solid free clear nutritional fruit juices by passing fruit juice through a mesh cloth or sieve to filter out solid residues;
  ii. preparing the solid free clear nutritional vegetable soup, comprising:
    a. slicing vegetables;
    b. cooking the sliced vegetables in water without added salt by simmering for a period of 30 minutes at about 80° C. to 95° C.; and
    c. filtering the nutritional vegetable soup to filter out and discarded the solid materials, wherein the filtered nutritional vegetable soup retains enzymes therein;
fasting for a duration of less than 90 days, after preparing the person's body and preparing the solid free clear nutritional fruit juice and solid free clear nutritional vegetable soup, wherein the fasting comprises:
  i. consuming 8 to 12 ounces of the filtered clear nutritional vegetable soup in combination with solid free liquefied vitamin and mineral supplements on a daily basis, to enabling production of glucose and numerous enzymes for glycolysis, the process of anaerobic conversion blood glucose to pyruvic acid and two molecules of adenosine triphosphate (ATP) per glucose molecule in the extramitochondrial portion of the cell; and
  ii. consuming 8 to 12 ounces of filtered clear solid free fruit juices every 2 to 4 hours on a daily basis throughout waking hours to maintaining a steady blood glucose level of 5 to 10 mM (90-180 mg/dL) and a brain satiety range preventing the onset of hunger sensing mechanism present in the brain hypothalamus and brain stem preventing or minimizing the hunger sensation of the fasting person;
  iii. wherein the consuming of the filtered clear nutritional vegetable soup in combination with solid free liquefied vitamin and mineral supplements, and the filtered clear solid free fruit juices provides: 800 to 1200 calories on a daily basis, representing a daily deficit of 600 to 1400 calories from a person diet before starting this method, to force the release of stored fats by hormone sensitive lipase to extramitochondrial portion of the cell, where glycolysis generated ATP is present and reacts with reacting with coenzyme A to produce a fatty acyl-CoA ester plus adenosine monophosphate (AMP), precursor to ATP, entering the inner barrier of the mitochondria with the help of carnitine to form acylcarnitine during beta oxidation to produce acyl-CoA ester that undergoes the TCA cycle within the mitochondria, producing many molecules of ATP, the essential constituent for all cell operations, whereby the generation of ATP by glycolysis in combination with beta oxidation of fats within the mitochondria enables the fasting person to exercise and function normally without weakness frequently observed in a fasting person;

wherein solid material is not consumed during the fasting; and wherein the absence of solid material during fasting reduces hunger pangs from gut sensors of K-cells and L-cells in the digestive organs;

using enemas or suppositories on a daily basis to facilitate evacuation of intestines with minimal solid residue; and stopping the fasting after the selected period ranging from 10 days to 90 days; consuming fruits in the morning and mid-day, then switching over to consuming raw vegetables in the evening and prior to bedtime by adding additional insoluble fibers such as whole flax seeds, chia seeds or bran flakes throughout the day, to adjust the digestive system for accepting solids for 3 to 5 days after fasting has stopped;

whereby the fasting person loses 0.5 to 1 pound of body weight each day during fasting with ability to exercise without feeling weak with minimal loss of muscle mass.

2. The method for hunger minimized fasting as recited in claim 1 wherein said solid free clear juices include: orange juice, apple juice, pineapple juice, grape juice, pomegranate juice, coconut water, watermelon juice, cantaloupe juice, carrot juice, beetroot juice, celery juice, or combinations thereof.

3. The method for hunger minimized fasting as recited in claim 1 wherein said nutritional vegetable soup contains carrots, broccoli, beets, celery, potatoes, sweet potatoes and other vegetables.

4. The method for hunger minimized fasting as recited in claim 1 wherein said fat carried by hormone sensitive lipase has a chain length greater than 10.

5. The method for hunger minimized fasting as recited in claim 1 wherein said consuming clear filtered vegetable boiled soups and clear filtered solid free juices of quantity 8 to 12 ounces on a daily basis after waking do not contain solid vitamin and mineral supplements since presence of solid material in the digestive tract invokes a hunger sensing mechanism of gut sensors and hormones by K-cells and L-cells, producing hunger pangs.

\* \* \* \* \*